US012628142B2

(12) United States Patent
    Hafeez

(10) Patent No.:     US 12,628,142 B2
(45) Date of Patent:          May 12, 2026

(54) DYNAMIC INCUMBENT PROTECTION

(71) Applicant: Charter Communications Operating, LLC, St. Louis, MO (US)

(72) Inventor: Rauf Hafeez, Cary, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 499 days.

(21) Appl. No.: 18/324,401

(22) Filed: May 26, 2023

(65) Prior Publication Data

US 2024/0397494 A1      Nov. 28, 2024

(51) Int. Cl.
   *H04W 72/0453*      (2023.01)
   *H04W 16/14*         (2009.01)
   *H04W 72/56*         (2023.01)

(52) U.S. Cl.
   CPC ....... *H04W 72/0453* (2013.01); *H04W 16/14* (2013.01); *H04W 72/56* (2023.01)

(58) Field of Classification Search
   CPC .. H04W 72/0453; H04W 72/56; H04W 16/14
   See application file for complete search history.

(56) References Cited

U.S. PATENT DOCUMENTS

| | | | | |
|---|---|---|---|---|
| 11,388,606 | B2 * | 7/2022 | Al-Mufti | ................. G01S 7/021 |
| 2019/0120969 | A1 * | 4/2019 | Hamzeh | .................. G01S 19/21 |
| 2019/0357155 | A1 * | 11/2019 | Al-Mufti | ............. H04W 52/243 |
| 2020/0059931 | A1 * | 2/2020 | Hannan | ............. H04W 72/0453 |
| 2021/0195429 | A1 * | 6/2021 | Macmullan | ....... H04W 72/0453 |
| 2022/0240099 | A1 * | 7/2022 | Al-Mufti | ................. G01S 7/021 |
| 2022/0256644 | A1 * | 8/2022 | Hafeez | ............. H04W 28/0864 |
| 2022/0322367 | A1 * | 10/2022 | Beck | ..................... H04W 4/023 |

(Continued)

FOREIGN PATENT DOCUMENTS

| | | | | | |
|---|---|---|---|---|---|
| CA | | 3168928 | A1 * | 9/2021 | ......... H04W 52/243 |
| CN | | 118975294 | A * | 11/2024 | |

(Continued)

OTHER PUBLICATIONS

"Dynamic Protection Areas Will Spur Spectrum Sharing." National Telecommunications and Information Administration. May 25, 2018 <https://www.ntia.gov/blog/2018/dynamic-protection-areas-will-spur-spectrum-sharing> Dec. 8, 2025.*

(Continued)

*Primary Examiner* — Andrew C Oh
(74) *Attorney, Agent, or Firm* — Mendelsohn Dunleavy, P.C.; Steve Mendelsohn

(57)          ABSTRACT

In a CBRS system, a spectrum access system (SAS) ensures access by incumbents to specified CBRS channels by establishing temporary whisper zones as needed based on information about incumbent locations and channel usage received from an incumbent tracking system. The SAS relies on environmental sensing capability (ESC) sensors located within the whisper zones to detect actual incumbent use of the specified channels. Upon such detection, the SAS controls the allocation of CBRS channels to non-whisper-zone base stations to ensure incumbent access within dynamic protection zones (DPZs). Establishing temporary whisper zone only when needed and ensuring incumbent access within DPZs based on detection of actual incumbent use result in efficient allocation of the CBRS spectrum for commercial use.

20 Claims, 4 Drawing Sheets

100

(56) References Cited

U.S. PATENT DOCUMENTS

| | | | | |
|---|---|---|---|---|
| 2023/0098387 A1* | 3/2023 | Hafeez | | H04W 52/143 |
| | | | | 370/329 |
| 2023/0308885 A1* | 9/2023 | Sirotkin | | H04W 24/08 |
| 2023/0319582 A1* | 10/2023 | Hafeez | | H04W 16/14 |
| 2024/0397494 A1* | 11/2024 | Hafeez | | H04W 16/14 |
| 2024/0406746 A1* | 12/2024 | Shah | | H04W 16/14 |
| 2024/0406942 A1* | 12/2024 | Hafeez | | H04W 16/14 |

FOREIGN PATENT DOCUMENTS

| ID | P202501687 A | * | 2/2025 | |
|---|---|---|---|---|
| JP | 2021108459 A | * | 7/2021 | |
| KR | 20240161808 A | * | 11/2024 | ........... H04W 16/10 |
| WO | WO-2018215974 A1 | * | 11/2018 | ........... H04W 4/021 |
| WO | WO-2019226173 A1 | * | 11/2019 | ........... H04W 16/14 |
| WO | WO-2020050856 A1 | * | 3/2020 | ........... H04M 15/66 |
| WO | WO-2020256706 A1 | * | 12/2020 | ........... H04W 16/14 |
| WO | WO-2021094951 A1 | * | 5/2021 | ........... H04W 24/02 |
| WO | WO-2021119051 A1 | * | 6/2021 | ........... H04W 24/02 |
| WO | WO-2022019180 A1 | * | 1/2022 | .......... H04W 52/243 |
| WO | WO-2022099015 A1 | * | 5/2022 | ........... H04W 16/14 |
| WO | WO-2023026694 A1 | * | 3/2023 | ........... H04W 16/28 |
| WO | WO-2023183257 A1 | * | 9/2023 | ........... H04W 16/10 |

OTHER PUBLICATIONS

Monica Alleven. "Google, Federated clash over how spectrum gets managed in CBRS, other bands." Fierce Network. Dec. 12, 2020 . <https://www.fierce-network.com/regulatory/google-federated-clash-over-how-spectrum-gets-managed-cbrs-other-bands> Dec. 8, 2025.*
"Spectrum Sharing at 3.5 GHz." NIST <https://www.nist.gov/system/files/documents/2019/06/24/spectrum_sharing.pdf> Dec. 28, 2025.*
"Potential Metrics for Assessing the Impact of ESC Sensors and Networks on CBRS Deployments." Wireless Innovation Forum, Document WINNF-TR-1015, Version v1.0.0, Jun. 14, 2021.*

* cited by examiner

DYNAMIC INCUMBENT PROTECTION

BACKGROUND

Field of the Disclosure

The present disclosure relates to wireless communications and, more specifically but not exclusively, to spectrum sharing between high-priority users such as incumbents and low-priority users such as wireless network operators in shared frequency bands such as CBRS.

Description of the Related Art

This section introduces aspects that may help facilitate a better understanding of the disclosure. Accordingly, the statements of this section are to be read in this light and are not to be understood as admissions about what is prior art or what is not prior art.

The Citizens Broadband Radio Service (CBRS) spectrum is a set of wireless communication channels that is shared between the U.S. government and commercial entities. There are three different categories of CBRS users, in order of priority: government and non-government users also known as incumbents, commercial Priority Access License (PAL) users, and commercial General Authorized Access (GAA) users. Use of the CBRS spectrum by the commercial PAL and GAA users is orchestrated by commercial Spectrum Access Systems (SASs), each of which controls the allocation of CBRS channels to CBRS base stations (referred to as CBSDs) that are associated with the SAS. In order to ensure access by incumbents to specific CBRS channels, e.g., one or more of the ten lowest-frequency channels in the CBRS spectrum, conventional SASs employ one of two different schemes.

In the so-called portal scheme, an incumbent operator reserves, with a SAS, specified CBRS channels during specified time periods within specified areas or volumes (referred to as Dynamic Protection Zones (DPZs)) within the continental U.S. for use by incumbents. The SAS controls the allocation of CBRS channels to its CBSDs within those DPZs during those time periods to ensure access to the specified CBRS channels by the incumbents. This control of CBRS channel allocation may involve temporarily preventing the CBSDs from using specific CBRS channels and/or reducing the maximum power level limits at which the CBSDs may transmit signals in those CBRS channels. One of the problems with the portal scheme is that incumbent operators are known to over-reserve CBRS spectrum resources, resulting in less-than-optimal spectrum availability for commercial operations.

The other conventional scheme for ensuring incumbent access to the CBRS spectrum relies on environmental sensing capability (ESC) sensors to detect actual use of specific CBRS channels by incumbents in real time. Because ESC sensors simply measure received signal power levels, they are not able to distinguish between incumbents and commercial PAL/GAA users. As such, a SAS establishes so-called whisper zones, which are geographic areas/volumes within which use of specific CBRS channels is either permanently banned or severely limited in terms of transmit power levels. A whisper zone is a relatively small region having at least one ESC sensor within a larger DPZ. If and when use of one or more of the specific CBRS channels is detected by an ESC sensor above a threshold power level, the SAS will determine in real time that an incumbent is using those CBRS channels in or near the corresponding whisper zone. In that case, the SAS will control the relevant CBSDs to restrict commercial use of those CBRS channels within the corresponding larger DPZ as long as the ESC sensor continues to detect the use of those CBRS channels within the whisper zone. One of the problems with this sensor-based scheme is that the commercial use of those CBRS channels within the whisper zones is permanently restricted, even when no nearby incumbent use is present, again resulting in less-than-optimal spectrum availability for commercial operations.

SUMMARY

In at least one embodiment, the present disclosure is a spectrum controller for controlling allocation of wireless channels to base stations of a wireless communication network. The spectrum controller comprises communication hardware controlled by a processor configured to cause the spectrum controller to (i) receive information indicating a need to establish a whisper zone for at least one specified wireless channel; (ii) control the allocation of the at least one specified wireless channel to at least one whisper-zone (WZ) base station to establish the whisper zone; (iii) receive an indication of detection of the at least one specified wireless channel within the whisper zone corresponding to use of the at least one specified wireless channel by a high-priority user; (iv) control the allocation of the at least one specified wireless channel to one or more non-whisper-zone (NWZ) base stations to ensure access to the at least one specified wireless channel by the high-priority user within a dynamic protection zone (DPZ) corresponding to the whisper zone; (v) receive information indicating end of use of the at least one specified wireless channel by the high-priority user within the DPZ; and (vi) control the allocation of the at least one specified wireless channel to the at least one WZ base station and the one or more NWZ base stations to at least one of (a) cease to ensure the access to the at least one specified wireless channel by the high-priority user within the DPZ and (b) terminate the whisper zone.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
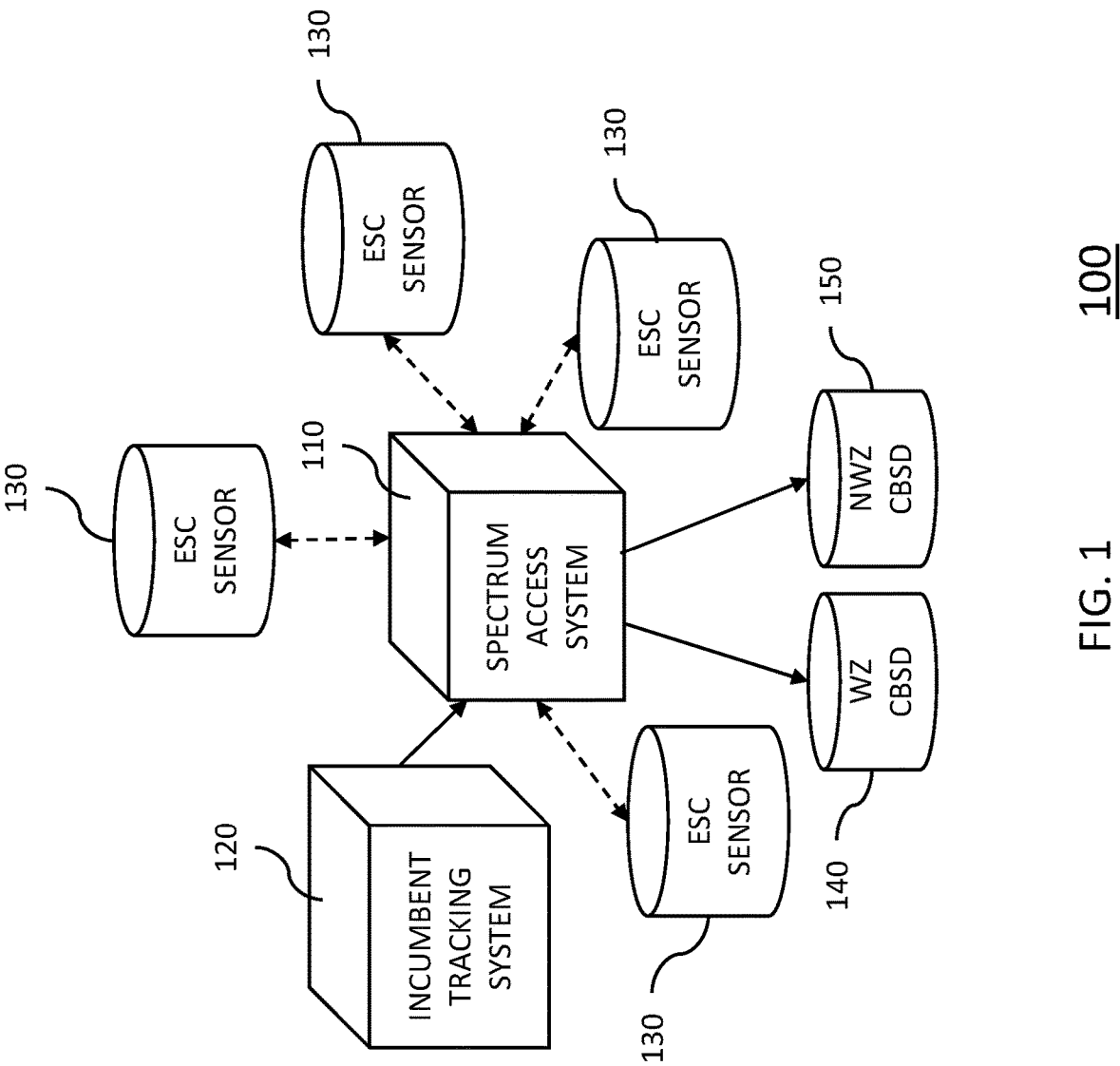
FIG. 1 is a simplified block diagram of a portion of a CBRS system, according to one embodiment of the disclosure.

FIG. 1 is a simplified block diagram of a portion of a CBRS system 100 according to one embodiment of the disclosure. As shown in FIG. 1, the CBRS system 100 has a spectrum access system (SAS) 110, an incumbent tracking system 120, environmental sensing capability (ESC) sensors 130, a whisper-zone (WZ) CBSD 140, and a non-whisper-zone (NWZ) CBSD 150. Although FIG. 1 shows only one SAS 110, four ESC sensors 130, one WZ CBSD 140, and one NWZ CBSD 150, in general, the CBRS system 100 may have any suitable number of ESC sensors 130 and one or more SASs 110, each of which controls the allocation of CBRS channels to one or more WZ CBSDs 140 and one or more NWZ CBSDs 150.

Figure 2:
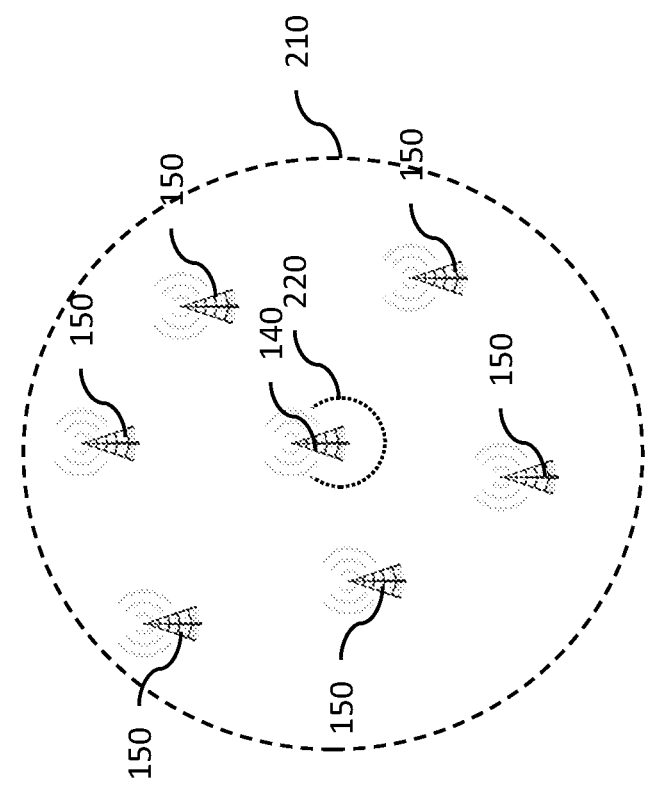
FIG. 2 is a simplified schematic diagram representing a single Dynamic Protection Zone (DPZ) of the CBRS system of FIG. 1.

FIG. 2 is a simplified schematic diagram representing a single Dynamic Protection Zone (DPZ) 210 of the CBRS system 100 of FIG. 1. As shown in FIG. 2, near the center of the DPZ 210 is a WZ CBSD 140 located at the center of a whisper zone 220. In addition, there are a number of NWZ CBSDs 150 located within the DPZ 210 but outside of the whisper zone 220. Although not explicitly shown in FIG. 2, co-located with the WZ CBSD 140 is at least one ESC sensor 130. Those skilled in the art will understand that the geographic area/volume of the continental United States may be divided into any suitable number of overlapping DPZs that together cover the entire geographic area/volume.

The incumbent tracking system 120 of FIG. 1 is a government-operated system that keeps track of the locations and movements of incumbents as well as the CBRS channels used by those incumbents. In some implementations of the CBRS system 100, the incumbent tracking system 120 provides to the SAS 110 schedules of the future locations and movements of incumbents and the CBRS channels to be used by those incumbents. In other implementations, in addition or instead, the incumbent tracking system 120 provides to the SAS 110 real-time information about the current locations and movements of incumbents and the CBRS channels that are currently being used by those incumbents.

In either case, the SAS 110 uses the information from the incumbent tracking system 120 to determine where and when to set up whisper zones 220 by controlling the allocation of CBRS channels to one or more WZ CBSDs 140 to enable the corresponding, co-located ESC sensors 130 to detect the use of the specified CBRS channels by incumbents. If and when incumbent use is actually detected by an ESC sensor 130 at a whisper zone 220, the SAS 110 will control the allocation of CBRS channels to the NWZ CBSDs 150 in the DPZ 210 corresponding to that whisper zone 220 to enable incumbents to use those CBRS channels. If and when the ESC sensor 130 no longer detects the use of the specified CBRS channels, the SAS 110 will be able once again to allocate those CBRS channels both to the NWZ CBSDs 150 and, unless the information from the incumbent tracking system 120 dictates otherwise, to the WZ CBSD 140.

In this way, the SAS 110 establishes temporary whisper zones 220 as determined based on the information received from the incumbent tracking system 120 and restricts use of the specified CBRS channels within the DPZ 210 outside of the whisper zone 220 only after actual use by an incumbent is detected by an ESC sensor 130 located within the whisper zone 220. In this way, the entire CBRS spectrum can be used for commercial users located within the DPZ 210 including the whisper zone 220 during periods in which incumbents are not scheduled to be present in or near the DPZ 210. Furthermore, even when incumbents are scheduled to be present, commercial use within the rest of the DPZ 210 outside of the whisper zone 220 is allowed to continue until actual use of the specified CBRS channels is detected by an ESC sensor 130 located within the whisper zone 220. The results are (i) restriction of commercial use of CBRS channels within whisper zones only when those channels are actually needed to detect incumbent use and (ii) restriction of commercial use of CBRS channels outside of whisper zones only when those channels are being used by incumbents, thereby providing much more efficient allocation of CBRS channels to commercial users.

Figure 3:
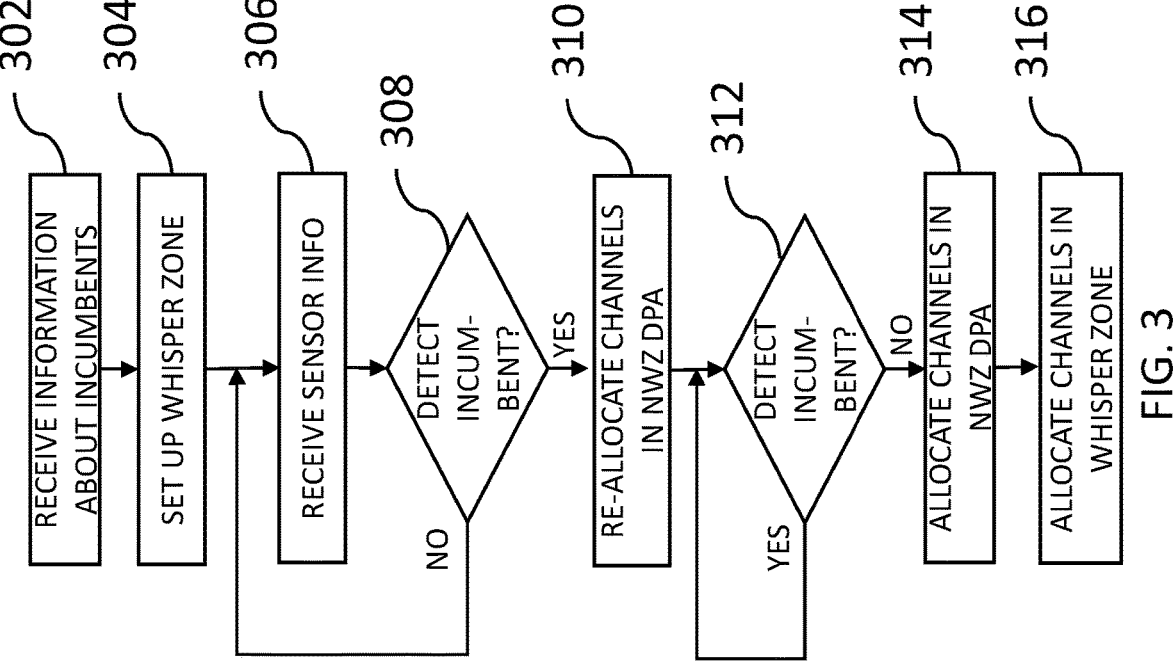
FIG. 3 is a flow diagram representing the processing performed by the SAS of FIG. 1 for a DPZ having a whisper zone, according to one embodiment of the disclosure.

FIG. 3 is a flow diagram representing the processing performed by the SAS 110 of FIG. 1 for a DPZ 210 having a whisper zone 220, according to one embodiment of the disclosure. In step 302, depending on the implementation, the SAS 110 receives, from the incumbent tracking system 120, schedules of future incumbent use of specified CBRS channels in specified locations and/or real-time information about current incumbent use in specified locations.

Based on the information received from the incumbent tracking system 120, in step 304, at an appropriate time, the SAS 110 controls the allocation of CBRS channels at an appropriate WZ CBSD 140 to set up the corresponding whisper zone 220.

In some implementations, the SAS 110 is able to power up the corresponding ESC sensors 130 when the whisper zone 220 is set up to enable the ESC sensors 130 to detect the actual use of CBRS channels. In other implementations, the ESC sensors 130 are always powered up, and the SAS 110 determines when to use the ESC sensors 130 to detect the actual use of the CBRS channels. In any case, depending on the implementation, in step 306, either (i) the SAS 110 receives and thresholds the actual ESC sensor measurements or (ii) the ESC sensors 130 perform that thresholding and provide the SAS 110 with an indication of the detection of actual use.

If, in step 308, incumbent use is not detected, then processing returns to step 306 to continue to monitor the whisper zone 220 for incumbent use. If incumbent use is detected in step 308, then, in step 310, the SAS 110 controls the allocation of the specified CBRS channels in the NWZ CBSDs 150 in the DPZ 210 to ensure incumbent access to those channels within the DPZ 210. If and when incumbent use is no longer detected by the ESC sensors 130 in step 312, then, in step 314, the SAS 110 can again allocate the specified CBRS channels to the NWZ CBSDs 150 in the DPZ 210 for commercial use. Furthermore, if and when allowed by the information from the incumbent tracking system 120, in step 316, the SAS 110 can again allocate the specified CBRS channels to the WZ CBSD 140.

Figure 4:
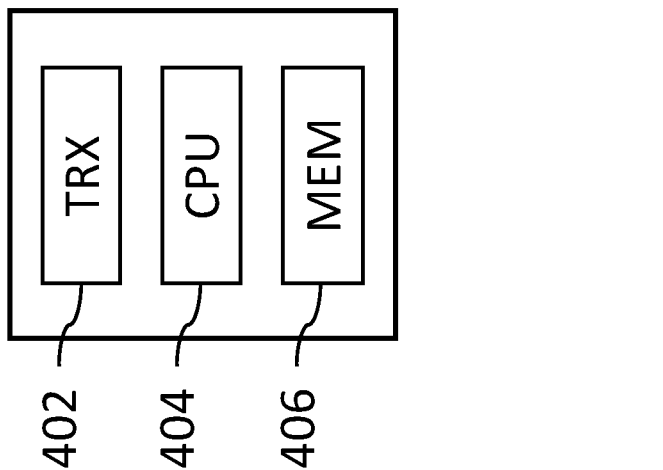
FIG. 4 is a simplified hardware block diagram of the SAS of FIG. 1, according to one embodiment of the disclosure.

FIG. 4 is a simplified hardware block diagram of the SAS 110 of FIG. 1 according to one embodiment of the disclosure. As shown in FIG. 4, the SAS 110 includes (i) communication hardware (e.g., wireless, wireline, and/or optical transceivers (TRX)) 402 that supports communications with other nodes in FIG. 1, (ii) a processor (e.g., CPU microprocessor) 404 that controls the operations of the SAS 110, and (iii) a memory (e.g., RAM, ROM) 406 that stores code executed by the processor 404 and/or data generated and/or received by the SAS 110.

Note that the CBRS channels associated with the whisper zone 220 of FIG. 2 may be different from the CBRS channels associated with the DPZ 210. For example, depending on the capabilities of the ESC sensors 130, more channels may be needed for the whisper zone 220 than for the DPZ 210. Assume, for example, that an incumbent is expected to use Channel 5. If the whisper zone's ESC sensor 130 is not able to distinguish between Channel 5 and other nearby channels, then the whisper zone 220 may need to be established for all of those channels in order for the whisper zone 220 to avoid misdetection of commercial use of one of those other channels as incumbent use of Channel 5. On the other hand, since conventional communication equipment is more discriminating than some ESC sensors 130, it may be that fewer channels or maybe even only Channel 5 will need to be made available within the larger DPZ 210 to ensure access by the incumbent to Channel 5 within the DPZ 210.

Although the disclosure has been described in the context of CBRS communication systems having CBSDs and SASs that share CBRS channels among government incumbents and commercial PAL/GAA users and ensure access to certain CBRS channels by the government incumbents, the disclosure is not so limited. In general, the disclosure relates to any wireless communication system having base stations that are controlled by a spectrum controller that allocates channels to ensure access by higher-priority users relative to lower-priority users.

In certain embodiments, the present disclosure is a spectrum controller for controlling allocation of wireless channels to base stations of a wireless communication network. The spectrum controller comprises communication hardware controlled by a processor configured to cause the spectrum controller to (i) receive information indicating a need to establish a whisper zone for at least one specified wireless channel; (ii) control the allocation of the at least one specified wireless channel to at least one whisper-zone (WZ) base station to establish the whisper zone; (iii) receive an indication of detection of the at least one specified wireless channel within the whisper zone corresponding to use of the at least one specified wireless channel by a high-priority user; (iv) control the allocation of the at least one specified wireless channel to one or more non-whisper-zone (NWZ) base stations to ensure access to the at least one specified wireless channel by the high-priority user within a dynamic protection zone (DPZ) corresponding to the whisper zone; (v) receive information indicating end of use of the at least one specified wireless channel by the high-priority user within the DPZ; and (vi) control the allocation of the at least one specified wireless channel to the at least one WZ base station and the one or more NWZ base stations to at least one of (a) cease to ensure the access to the at least one specified wireless channel by the high-priority user within the DPZ and (b) terminate the whisper zone.

In at least some of the above embodiments, the whisper zone is established by the spectrum controller by de-allocating the at least one specified wireless channel from the at least one WZ base station and/or reducing maximum transmit power level for the at least one specified wireless channel by the at least one WZ base station.

In at least some of the above embodiments, the spectrum controller receives the indication of detection of the at least one specified wireless channel within the whisper zone corresponding to use of the at least one specified wireless channel by the high-priority user from an environmental sensing capability (ESC) sensor located within the whisper zone.

In at least some of the above embodiments, the indication of detection corresponds to the ESC sensor detecting a received power level for the at least one specified wireless channel above a power level threshold value.

In at least some of the above embodiments, the information indicating the end of use of the at least one specified wireless channel by the high-priority user within the DPZ is based on detecting a received power level for the at least one specified wireless channel below a power level threshold value.

In at least some of the above embodiments, the information indicating the end of use of the at least one specified wireless channel by the high-priority user within the DPZ is based on an indication that the high-priority user has left the DPZ or has become inactive.

In at least some of the above embodiments, the information indicating the need to establish the whisper zone for the at least one specified wireless channel is received from a tracking system configured to track one or more of the geographic location, height, or activity of the high-priority user.

In at least some of the above embodiments, the whisper zone has a set of associated wireless channels that is different from a set of associated wireless channels for the DPZ.

In at least some of the above embodiments, the spectrum controller is configured to control the allocation of the at least one specified wireless channel to the at least one WZ base station and the one or more NWZ base stations to (i) cease to ensure the access to the at least one specified wireless channel by the high-priority user within the DPZ and (ii) terminate the whisper zone.

In at least some of the above embodiments, the at least one specified wireless channel is a Citizens Broadband Radio Service (CBRS) channel; the spectrum controller is a CBRS spectrum access system (SAS); the base stations are CBRS base stations (CBSDs); and the high-priority user is a CBRS incumbent.

Although not explicitly shown in the figures, each node in the figures has at least one processor (e.g., a CPU) for processing incoming and/or outgoing data, memory (e.g., RAM, ROM) for storing data and (in some implementations) program code to be executed by the processor, and communication hardware (e.g., transceivers) for communicating with one or more other nodes.

Unless explicitly stated otherwise, each numerical value and range should be interpreted as being approximate as if the word "about" or "approximately" preceded the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1-only A; 2-only B; 3-both A and B.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A spectrum controller for controlling allocation of wireless channels to base stations of a wireless communication network, wherein the spectrum controller comprises communication hardware controlled by a processor configured to cause the spectrum controller to:

receive information indicating a need to establish a whisper zone for at least one specified wireless channel;

control the allocation of the at least one specified wireless channel to at least one whisper-zone (WZ) base station to establish the whisper zone;

receive an indication of detection of the at least one specified wireless channel within the whisper zone corresponding to use of the at least one specified wireless channel by a high-priority user;

control the allocation of the at least one specified wireless channel to one or more non-whisper-zone (NWZ) base stations to ensure access to the at least one specified wireless channel by the high-priority user within a dynamic protection zone (DPZ) corresponding to the whisper zone;

receive information indicating end of use of the at least one specified wireless channel by the high-priority user within the DPZ; and control the allocation of the at least one specified wireless channel to the at least one WZ base station and the one or more NWZ base stations to at least one of (i) cease to ensure the access to the at least one specified wireless channel by the high-priority user within the DPZ and (ii) terminate the whisper zone.

2. The spectrum controller of claim 1, wherein the whisper zone is established by the spectrum controller by de-allocating the at least one specified wireless channel from the at least one WZ base station and/or reducing maximum transmit power level for the at least one specified wireless channel by the at least one WZ base station.

3. The spectrum controller of claim 1, wherein the spectrum controller receives the indication of detection of the at least one specified wireless channel within the whisper zone corresponding to use of the at least one specified wireless channel by the high-priority user from an environmental sensing capability (ESC) sensor located within the whisper zone.

4. The spectrum controller of claim 3, wherein the indication of detection corresponds to the ESC sensor detecting a received power level for the at least one specified wireless channel above a power level threshold value.

5. The spectrum controller of claim 3, wherein the information indicating the end of use of the at least one specified wireless channel by the high-priority user within the DPZ is based on detecting a received power level for the at least one specified wireless channel below a power level threshold value.

6. The spectrum controller of claim 1, wherein the information indicating the end of use of the at least one specified wireless channel by the high-priority user within the DPZ is based on an indication that the high-priority user has left the DPZ or has become inactive.

7. The spectrum controller of claim 1, wherein the information indicating the need to establish the whisper zone for the at least one specified wireless channel is received from a tracking system configured to track one or more of the geographic location, height, or activity of the high-priority user.

8. The spectrum controller of claim 1, wherein the whisper zone has a set of associated wireless channels that is different from a set of associated wireless channels for the DPZ.

9. The spectrum controller of claim 1, wherein the spectrum controller is configured to control the allocation of the at least one specified wireless channel to the at least one WZ base station and the one or more NWZ base stations to (i) cease to ensure the access to the at least one specified wireless channel by the high-priority user within the DPZ and (ii) terminate the whisper zone.

10. The spectrum controller of claim 1, wherein:

the at least one specified wireless channel is a Citizens Broadband Radio Service (CBRS) channel;

the spectrum controller is a CBRS spectrum access system (SAS);

the base stations are CBRS base stations (CBSDs); and the high-priority user is a CBRS incumbent.

11. A machine-implemented method for controlling allocation of wireless channels to base stations of a wireless communication network, the method comprising a spectrum controller:

receiving information indicating a need to establish a whisper zone for at least one specified wireless channel;

controlling the allocation of the at least one specified wireless channel to at least one whisper-zone (WZ) base station to establish the whisper zone;

receiving an indication of detection of the at least one specified wireless channel within the whisper zone corresponding to use of the at least one specified wireless channel by a high-priority user;

controlling the allocation of the at least one specified wireless channel to one or more non-whisper-zone (NWZ) base stations to ensure access to the at least one specified wireless channel by the high-priority user within a dynamic protection zone (DPZ) corresponding to the whisper zone;

receiving information indicating end of use of the at least one specified wireless channel by the high-priority user within the DPZ; and controlling the allocation of the at least one specified wireless channel to the at least one WZ base station and the one or more NWZ base stations to at least one of (i) cease to ensure the access to the at least one specified wireless channel by the high-priority user within the DPZ and (ii) terminate the whisper zone.

12. The method of claim 11, wherein the whisper zone is established by the spectrum controller by de-allocating the at least one specified wireless channel from the at least one WZ base station and/or reducing maximum transmit power level for the at least one specified wireless channel by the at least one WZ base station.

13. The method of claim 11 wherein the spectrum controller receives the indication of detection of the at least one specified wireless channel within the whisper zone corresponding to use of the at least one specified wireless channel by the high-priority user from an environmental sensing capability (ESC) sensor located within the whisper zone.

14. The method of claim 13, wherein the indication of detection corresponds to the ESC sensor detecting a received power level for the at least one specified wireless channel above a power level threshold value.

15. The method of claim 13, wherein the information indicating the end of use of the at least one specified wireless channel by the high-priority user within the DPZ is based on detecting a received power level for the at least one specified wireless channel below a power level threshold value.

16. The method of claim 11, wherein the information indicating the end of use of the at least one specified wireless channel by the high-priority user within the DPZ is based on an indication that the high-priority user has left the DPZ or has become inactive.

17. The method of claim 11, wherein the information indicating the need to establish the whisper zone for the at least one specified wireless channel is received from a tracking system configured to track one or more of the geographic location, height, or activity of the high-priority user.

18. The method of claim 11, wherein the whisper zone has a set of associated wireless channels that is different from a set of associated wireless channels for the DPZ.

19. The method of claim 11, wherein the spectrum controller controls the allocation of the at least one specified wireless channel to the at least one WZ base station and the one or more NWZ base stations to (i) cease to ensure the access to the at least one specified wireless channel by the high-priority user within the DPZ and (ii) terminate the whisper zone.

20. The method of claim 11, wherein:

the at least one specified wireless channel is a Citizens Broadband Radio Service (CBRS) channel;

the spectrum controller is a CBRS spectrum access system (SAS);

the base stations are CBRS base stations (CBSDs); and the high-priority user is a CBRS incumbent.

* * * * *